April 16, 1968   A. C. HAWKINS   3,377,744
IRRIGATOR FOR FLORAL CONTAINERS
Filed June 13, 1966

A. CARL HAWKINS,
INVENTOR.

BY *Robert A. Spray*

ATTORNEY

United States Patent Office 3,377,744
Patented Apr. 16, 1968

3,377,744
IRRIGATOR FOR FLORAL CONTAINERS
A. Carl Hawkins, 960 Layman Ave.,
Indianapolis, Ind. 46219
Filed June 13, 1966, Ser. No. 557,201
1 Claim. (Cl. 47—38.1)

ABSTRACT OF THE DISCLOSURE

A moisture means for mounting on a floral container, such as used in a cemetery, which supplies moisture to the container and thereby keeps the floral arrangement in an attractive state for a prolonged period, the moisture means being mountable on most types of present containers and along the side thereof so as to be inconspicuous.

---

This invention relates to a moisture means, and more particularly to a moisture means for floral arrangements in baskets, such as are used for decorating a gravesite in a cemetery.

Floral arrangements for gravesites are often quite attractive; but are often relatively expensive, and their location in a cemetery often requires a relatively long or inconvenient trip by the family-member to place the floral arrangement or to replenish its moisture to the extent desirable to keep the floral arrangement attractive.

Many cemeteries do not have facilities or means for watering these floral arrangements; nor do many cemeteries have water outlets conveniently accessible to the gravesites to permit convenient watering the floral arrangements even if the family member were to visit the cemetery frequently enough to keep adequate moisture on the floral arrangement.

Consequently, a familiar sight in a cemetery is that of wilted and dying floral arrangements.

However, a gravesite floral arrangement which has become wilted and dry is not only unattractive, but, to some persons, may tend to indicate a feeling of lack of respect for the person who is buried or that person's memory.

Further, the sight of wilted floral arrangements tends to manifest a sense of gloom to the entire area.

Concepts of the present invention, accordingly, provide novel and advantageous moisture means which supply moisture to a floral arrangement throughout a relatively long period of time, thus assuring a prolonged period of attractiveness and vitality to the floral arrangement, by a moisture device which is relatively inexpensive and hence may be quite economically purchased by many. The advantages are such that the cemetery management itself will be motivated to encourage the use of the moisture means, and/or to assist in the distribution thereof.

The above is quite introductory; and these and further co-operating details, features, concepts, and advantages will be further apparent in the more detailed description which follows, of an embodiment to illustrate the inventive concepts, reference being had to the accompanying somewhat diagrammatic and schematic drawings, in which.

Figure 1:
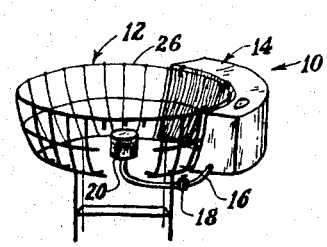
FIG. 1 is a pictorial sketch, illustrating the moisture means assembled onto a floral arrangement basket, portions of the basket being broken away for clarity.
Figure 2:
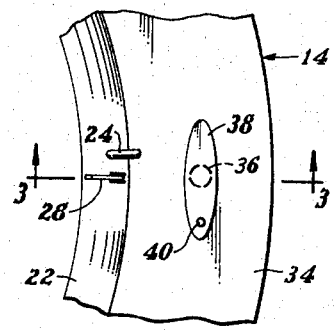
FIG. 2 is a fragmental, plan-view detail of the moisture means reservoir, in larger scale than FIG. 1.

As shown in the drawings, the present invention provides a moisture means 10 for floral arrangement baskets. An assembly of such a moisture means 10 upon a basket 12 is illustrated in FIG. 1. As there shown, in an illustrative embodiment, the moisture means generally comprises a reservoir member 14, having an outlet tube 16 having a valve 18, and a water outlet head 20.

Figure 3:
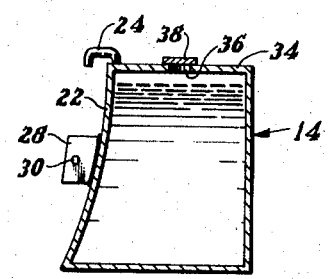
FIG. 3 is a cross-sectional view of the reservoir, the view being taken generally as indicated by section line 3—3 of FIG. 2.

As shown, the reservoir 14 is formed to be of arcuate form, and thus in its assembled position (FIG. 1), it snugly lies exteriorly of the basket 12 and along a portion of the basket periphery. The reservoir 14 is of relatively narrow radial width; and thus it is easily concealed by the flowers and/or other vegetation of the basket 12. The reservoir 14, along its portion adjacent the basket 12, is shown (FIG. 3) as having a curved basket-facing wall 22, thus providing more volume for the reservoir 14.

Figure 4:
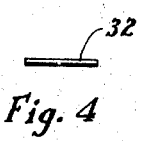
FIG. 4 is a view of a locking pin.

Hooks 24 are provided on the reservoir, adapted to be hooked over the rim 26 of the basket 12, supporting the reservoir 14 on the basket 12. A fin 28 is shown as extending from the basket-facing wall 22, the fin 28 being of a length such that it will enter into the interior of the basket 12; and the fin 28 is provided with an opening 30, through which may be extended a pin 32 (FIG. 4), or other locking means, such as a padlock. The fin 28 is desirably at a low enough elevation that it and its pin 32 would be concealed by the earth or growing things of the basket 12, thus providing both neatness of appearance, and minimizing the chance of another person observing how the moisture means 10 could be removed and stolen, even though the installation and removability of the moisture means pin 32 is quite easy and convenient.

The upper reservoir wall 34 is shown as provided with an opening 36, through which the reservoir may be provided with water; and the opening 36 is shown as covered simply by a pivotal plate 38 which pivots around a rivet 40 in the wall 34.

The water conduit 16 is provided with a valve means 18, desirably of a type such as a needle valve which can be conveniently adjusted so that only a small trickle of water will be dispensed. The conduit 16 leads to a water outlet head member 20, now to be described.

Figure 5:
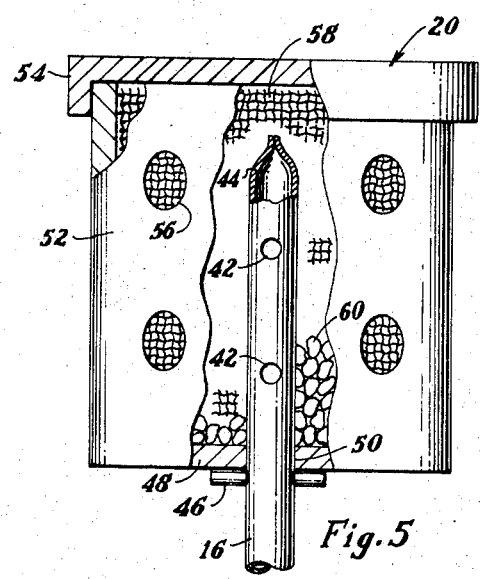
FIG. 5 is an elevational view of the liquid outlet head member, in substantially enlarged scale, portions being broken away for clarity of presentation of interior details.

As shown in FIG. 5, the conduit 16 extends into the interior of a water outlet head member 20. Interiorly of the outlet head 20, the tube is provided with one or more outlet openings 42; and the extreme end of the tube 16 is shown as closed by the crimping 44, it not particularly mattering whether or not the crimping 44 provides an absolute seal.

The head 20 is supported on the conduit 16 by a pin 46 shown as passing through the conduit; and the lower wall 48 of the head-member 20 rests upon the pin 46.

The head member 20 is shown as including a cylindrical shell 52, which is covered by enclosure cap 54; and the shell 52 is shown as provided with a plurality of openings 56 through which the water in the head member 20 may pass to saturate the earth or absorbent material in the floral basket 12.

Figure 6:
FIG. 6 is an elevational view, in reduced scale in comparison to FIG. 5, of a screen member used in the outlet head member.

A strip of screen 58 (FIGS. 5 and 6) is shown as bent into a cylindrical shape and is inserted within the shell 52, permitting the passage of moisture through the shell openings 56, but blocking those openings against the passage of other material.

Granular material 60 is provided in the interior of the water outlet head 20 of a type which will transmit moisture from the conduit-openings 42, and permit that moisture to soak into the adjacent earth or other material outside the water outlet head 20.

Installation of the moisture means 10 is quite easy and convenient. To install the moisture means 10 onto the basket 12, the user need only to insert the outlet head 20 through an opening in the basket 12, and hang the reservoir 14 onto the basket, three of the hooks 24 being shown in the embodiment shown in FIG. 1. In this position, the fin 28 extends through an opening in the basket wall and the locking pin 32 or other locking means is passed through the fin-opening 30. Then the basket 12 is filled with whatever material is desired, such as dirt, peat moss, or other material, and the growing flowers are then embedded in the dirt in the basket. The reservoir 14 is of a capacity such that it holds sufficient water for several days' moisturizing of the floral arrangement.

It will be noted that the shell openings 56 are spaced around the shell 52, and these openings 56, the screening 58, and the granular material 60 provide that moisture will tend to be soaked from the head member 20 in a generally uniform amount in each direction, the head member 20 being desirably positioned in a generally central position of the basket 12. This central positioning of head 20 is accommodated by the flexibility of the conduit 16; thus the device 10 may be advantageously used with different size flower baskets.

It is thus seen that a moisture means according to concepts of the present invention provides novel and advantageous concepts and features providing for the prolonged watering of the floral arrangement, the device being easy to install and to use, and giving longer vitality and attractiveness to floral arrangements not conveniently moisturizing by other means.

Accordingly, it will be seen from the foregoing description of the invention, according to the embodiment to illustrate the inventive concepts, considered with the accompanying drawings, that the present invention provides a new and useful moisture device having desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific form or arrangement of components or features herein described or shown as illustrative of the inventive concepts, in the particular embodiment disclosed.

What is claimed is:

1. A moisture means for functionally co-operative association with: a floral arrangement container having a wall means, said moisture means comprising:

a reservoir member adapted to be mounted on said container;

conduit means extending from said reservoir member to the interior of said container;

means providing a restricted flow through said conduit;

and an outlet means for said conduit operatively interiorly of said container;

mounting means being provided for co-operation with said container wall means for supportingly mounting the moisture means thereon at the side of said container and generally within the vertical limits thereof;

there also being provided a protruding means on the said moisture means, which when the said moisture means is assembled onto the said container, provides means for fixedly securing the said moisture means to the said container;

both the said conduit and the said protruding means operatively extending through the said container wall means, when the moisture means is assembled onto the container, thereby providing, with respect to said conduit, that moisture fluid will flow through said conduit by gravity from said reservoir member to the said outlet means, the entirety of said conduit being at a level below that of the surface of moisture fluid in said reservoir member, and providing also, with respect to said protruding means, that it will be concealed by material in said container.

References Cited

UNITED STATES PATENTS

| | | | |
|---|---|---|---|
| 880,968 | 3/1908 | Bunker | 47—38.1 |
| 1,231,975 | 7/1917 | Weitzel | 47—38.1 |
| 1,400,628 | 12/1921 | Rudolph | 47—38.1 |
| 2,183,970 | 12/1939 | Meissl | 47—38.1 |
| 2,515,600 | 7/1950 | Hayes. | |
| 3,069,807 | 12/1962 | Wall | 47—38.1 |

ROBERT E. BAGWILL, *Primary Examiner.*